United States Patent
Mutz et al.

[11] 3,890,514
[45] June 17, 1975

[54] STEP MOTOR WITH OSCILLATION DAMPING

[75] Inventors: Gerhard Mutz, Villingen-Schwenningen; Edmund Bausch, Kirchen-Hausen, both of Germany

[73] Assignee: Binder Magnete GmbH, Villingen, Germany

[22] Filed: Oct. 3, 1973

[21] Appl. No.: 403,212

[30] Foreign Application Priority Data
Oct. 11, 1972 Germany............... 2249648

[52] U.S. Cl. ............... 310/49; 310/51; 188/1 B
[51] Int. Cl. ............................................. H02k 37/00
[58] Field of Search ....... 310/49, 51, 183, 112, 162, 310/1, 164, 261, 265; 260/D42; 64/1 V; 74/573, 574; 188/1 B, 267; 336/100

[56] References Cited
UNITED STATES PATENTS

| 508,634 | 11/1893 | Priest | 310/51 |
|---|---|---|---|
| 3,274,798 | 9/1966 | Wiggins | 64/1 V |
| 3,286,109 | 11/1966 | Madsen | 310/51 |
| 3,336,818 | 8/1967 | Allen | 188/267 |
| 3,453,465 | 7/1969 | De Boer | 310/49 |
| 3,462,667 | 8/1969 | Jackson | 310/49 |
| 3,549,918 | 12/1970 | Croymans | 310/49 |
| 3,686,895 | 8/1972 | Easley | 64/1 V |
| 3,786,694 | 1/1974 | Willeitner | 310/51 |

*Primary Examiner*—R. J. Skudy
*Attorney, Agent, or Firm*—Waters, Schwartz & Nissen

[57] ABSTRACT

A step motor having an oscillation-damped rotor in which rotary member or members serving as friction dampers comprise integral elements of the rotor and which, preferably together with the latter, are located in the magnetic main flow of the stator systems. The rotary member may be supported in frictional contact within a hollow, cylindrically formed rotor which is rotatably supported at both ends thereof. As the friction there is utilized herein either the sliding friction between the rotary member and the inner surface of the hollow cylinder or, when the hollow cylinder is filled in a known manner with a fluid medium such as, for example, oil, viscosity friction. Alternatively, for effecting oscillation damping there may be exclusively utilized the sliding friction between the rotor and one or more rotary members. In this instance, the rotor, which may be solidly constructed, may be provided with at least one annularly-shaped cutout in which on or more rings serving as friction dampers may be located so as to be rotatable coaxially relative to the rotor axis.

14 Claims, 4 Drawing Figures

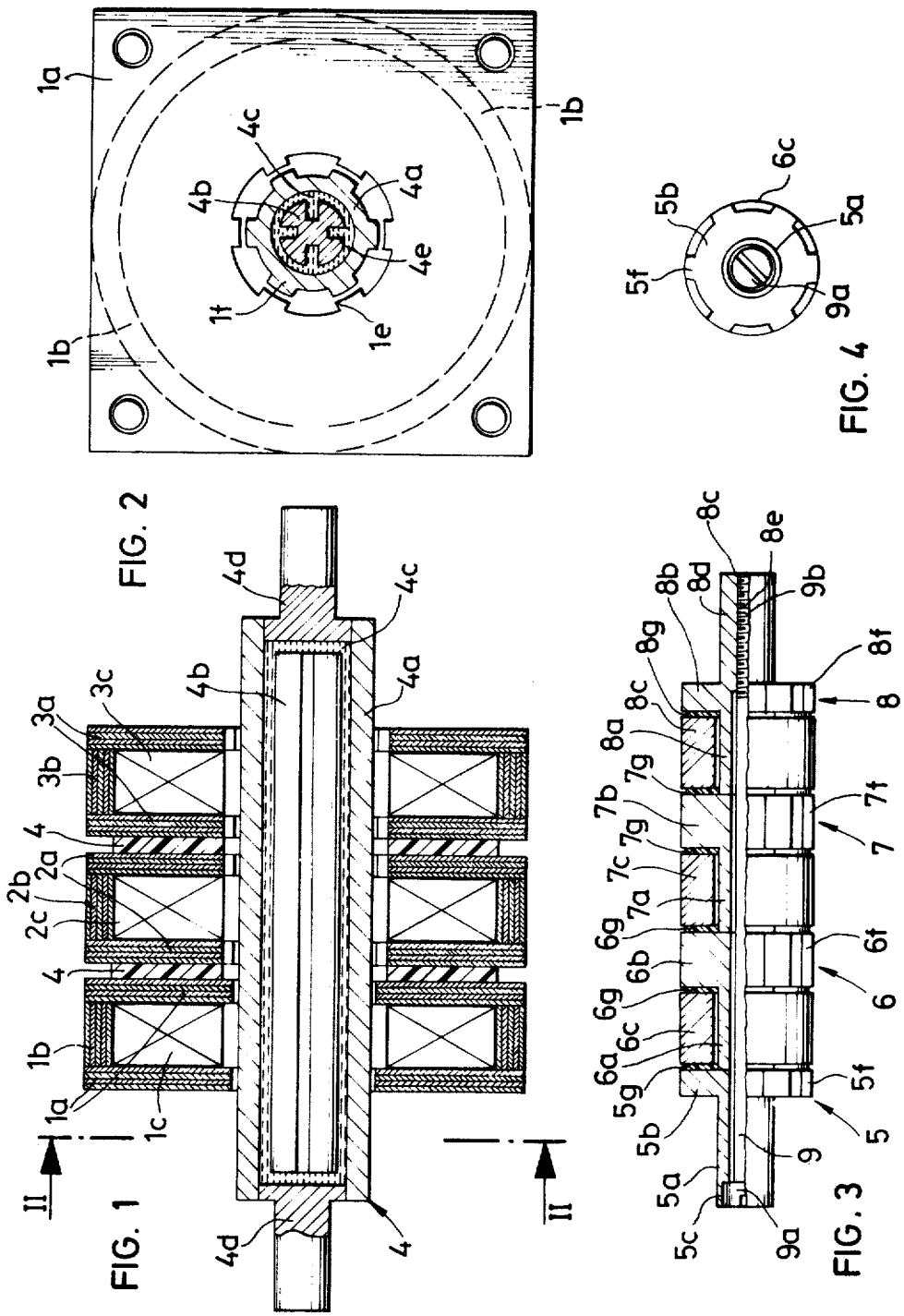

STEP MOTOR WITH OSCILLATION DAMPING

FIELD OF THE INVENTION

The present invention relates to a step motor which comprises a plurality of axially serially positioned stator systems, and a single rotor.

In step motors, the pole pieces of the stator systems or, respectively, of the rotor sections, are displaced relative to each other so that the rotor is placed into rotation through sequentially effected excitation of the stator systems and, in dependence upon the duration of the excitation and the frequency of the excitation field, is displaced through a definite angle of rotation. On the basis of this property, the rotor may be positioned into a precisely predetermined angular position, so as to be thereby particularly suitable as a servomotor for control purposes and the like. A disadvantage lies herein in that the rotor after carrying out of one or more switching steps and during a longer or shorter decaying period effects rotary oscillations.

DISCUSSION OF THE PRIOR ART

In order to reduce the decaying period, at present there is known a friction damper in the form of an oil-filled chamber comprising a rotary member which is connectable with a shaft end of the rotor, and which is provided interiorly thereof with a floating, in effect, a freely rotatably supported core. In this arrangement the torque energy is dissipated through the friction which is present between the core, oil and chamber, so as to thereby reduce the decaying period.

The application of that type of auxiliary arrangement as friction damper, however, it inherently subject to a number of disadvantages, so as to render it unsuitable for numerous purposes and applications.

On the one hand, through use of the auxiliary friction damping there is an increase in the moment of inertia and consequently in the operating time of the step motor. Above all, in each instance the rotor of the step motor is elongated by the auxiliary friction damper, so as to have larger spatial requirements. Furthermore, one of the two shaft ends of the rotor is thereby utilized, so that at that end frequently no further drive shafts or control discs can be located.

SUMMARY OF THE INVENTION

According to the present invention there is proposed a step motor having an oscillation-damped rotor, in which the disadvantages of the prior art are obviated in an extremely simple manner, in which the rotary member or members serving as the friction damper comprise integral elements of the rotor and which, preferably together with the latter, are located in the magnetic main flow of the stator systems.

Since the rotor of a step motor in any event requires a predetermined minimum cross-section for the conducting of the magnetic flow, in accordance with the inventive concept there is no need for an increase in the rotor dimensions, wherein the rotary member serving as the friction damper may be utilized for the condution of magnetic flow.

In a preferred embodiment according to the invention the rotary member is supported in frictional contact within a hollow cylindrically formed rotor which is rotatably supported at both ends thereof. As the friction there is utilized herein either the sliding friction between the rotary member and the inner surface of the hollow cylinder or, when the hollow cylinder is filled in a known manner with a fluid medium such as, for example, oil, viscosity friction. The friction values and thereby the damping effect may furthermore be increased in that the outer surface of the rotary member or members and/or the inner surface of the hollow cylinder may be roughened, or may be provided with cuts, particularly axially extending grooves, ridges, slits or the like, which concurrently effect a reduction in losses caused by turbulent flow.

In a further embodiment of the invention, for effecting oscillation damping there is exclusively utilized the sliding friction between the rotor and one or more rotary members. In this instance, the rotor, which may be solidly constructed, may be provided with at least one annularly-shaped cutout in which one or more rings serving as friction dampers may be located so as to be rotatable coaxially relative to the rotor axis.

The rotor with the damping rings according to the second embodiment of the invention is particularly suited for step motors formed of prefabricated components which can be assembled, according to copending U.S. Pat. application Ser. No. 405,645, now U.S. Pat. No. 3,855,486 issued on Dec. 17, 1974. In this instance it is recommended, as further proposed, that the rotor be assembled of a plurality of axially serially positioned elements, which alternately comprise cylindrical sections of smaller and cylindrical sections of larger diameter, the sections of smaller diameters having damping rings rotatably supported thereon. In accordance with the number of required stator systems there may be provided a rotor assembled of a corresponding number of components and interconnected with an axially extending screw bolt. Further constructional details of this proposal may be ascertained in the description of the figures of the drawings.

In order to prevent adhesion of the damping rings to the solid rotor components, it further is possible to provide intermediate the damping rings and the rotor components, and particularly in the region of the side contact surfaces, insulating discs which are formed of non-magnetic material.

As the material for the rotary members, or respectively, damping rings, there are particularly suited, for all embodiments, iron or similar soft magnetic metals.

BRIEF DESCRIPTION OF THE DRAWINGS

The object of the invention may be ascertained in detail from the following two exemplary embodiments which are schematically illustrated in the drawing, and in which:

FIG. 1 illustrates in an axial section a novel step motor shown without a bearing cover pursuant to a first embodiment of the invention;

FIG. 2 is a transverse section taken along line II—II in FIG. 1;

FIG. 3 is an axial section of a rotor constructed pursuant to a second embodiment of the invention; and FIG. 4 is a front end view of the rotor of FIG. 3.

DETAILED DESCRIPTION

The step motor illustrated in FIGS. 1 and 2 of the drawing consists of three axially serially positioned stator systems having laminated stator pole discs 1a, 2a, 3a, between which there are provided insulating discs 4 formed of non-magnetic material; similarly laminated half-shell shaped yokes 1b, 2b, 3c; concentrically wound stator coils 1c, 2c, 3c; and a common rotor 4. The bearing covers which hold the stator systems together and support the rotor are not shown in the drawings.

The rotor 4 consists of a hollow cylinder 4a wherein, in the oil-tight hollow interior thereof, there are supported in oil or similar fluid medium, rotary members 4b serving as oscillation dampers. At both ends thereof, the hollow cylinder 4 is provided with shaft ends 4d on which there may be supported take-off drive shafts, control discs, or the like.

In order to increase the viscosity friction, as well as to effect a reduction in turbulence flow losses, the rotary members may be provided with axially extending grooves 4e.

In particular, in FIG. 2 of the drawing there may further be ascertained the pole pieces 1e of the forward pole disc 1a as well as the pole pieces 4f of the rotor cylinder 4a. In this figure of the drawing the half-shell shaped yoke 1b is illustrated through chain-dotted lines.

The rotor of the second embodiment illustrated in FIGS. 3 and 4 of the drawings operates in the absence of viscous friction. This rotor is assembled of components 5 through 8, in which, for example, there are indicated cylindrical sections with smaller diameters 5a through 8a, and sections with larger diameters 5b through 8b. On the sections 6a through 8a of the elements 6 through 8 there are supported, in a frictionally rotatable manner, between the disc-shaped sections 5b through 8b, the space-filling damping rings 6e through 8c. The section 5a of the left-hand element 5 shown in FIG. 3, and a correspondingly shaped section 8d of the right-hand component respectively serve as shaft ends, by means of which the rotor is journaled within the stator housing (not shown). Various elements are bored through in an axial direction, wherein the bored-through element 8 is provided with an internal thread 8e, and the bore through the element 5 with a recess 5c. The elements are fastened together by means of a common axial screw bolt 9 whose head 9a is positioned in the recess 5c of element 5 and whose threaded portion 9b engages the thread 8e of element 8.

All of the rotor elements with the sections having the larger diameters 5b through 8b are provided, as in the case of the rotor according to FIGS. 1 and 2, with a number of stator pole piece member corresponding to the number of pole pieces 5f through 8f, as may be ascertained by the front view of FIG. 4 of the drawing.

In both embodiments the rotary members serving as the friction dampers, or respectively, damping rings, are formed of a soft magnetic material, namely, iron. In order to prevent the damping rings 6c, 7c and 8c from adhering to the rotor element 5 through 8 due to magnetizing, there are positioned, intermediate the side contact surfaces thereof, discs 5g through 8g which are formed of a non-magnetic material. If required, there may be provided between the contact surfaces of the section 6a–8a and the damping rings 6c–8c additional insulating sleeves formed of non-magnetic material, or the contacting outer surfaces may be covered with a corresponding material layer, for example, chrome covered.

Both step motors with the inventively constructed rotors have the following operating sequence:

The stator pieces 1c–3c, which may be ascertained only from FIG. 1, are excited sequentially and also at a predetermined phase displacement whereby the rotor is further rotated through one or more steps respectively in conformance with the pole distribution. The magnetic flow which is conveyed from the stator pole discs and the yokes hereby streams through the rotor inclusive its friction dampers, which are formed of a soft magnetic material. The rotary members, or respectively the damping rings are carried along through upper surfaces, or respectively, viscous friction. After completion of the switching step, the rotor for a predetermined time period is subjected to rotary oscillations unitl it comes to rest. Since the rotary members, or respectively the damping rings, communicate with the other components of the rotor only through friction, they follow the oscillatory movement of the rotor in a delayed manner so that there occurs a phase displacement between the angular velocities of the rotor and of the rotary members or damping rings. This phase displacement in the rotary oscillations leads to appreciately accelerated damping, inasmuch as the released kinetic energy caused by the restraint of the rotor is dissipated by additionally generated friction losses.

Investigations have indicated that, by means of the present inventive measures, the decaying time of comparable devices may be reduced to 20–30% of the usual time period.

While there has been shown what is considered to be the preferred embodiment of the invention, it will be obvious that modifications may be made which come within the scope of the disclosure of the specification.

What is claimed is:

1. In a step motor comprising a plurality of axially serially positioned stator systems and a rotor; and at least one rotary member being in frictionally rotatable communication with said rotor for effecting rotary oscillation damping thereof, the improvement comprising; said rotor comprising a hollow cylinder rotatably journalled at both ends thereof, said rotary member being rotatably supported within and in frictional contact with the inner surface of said hollow cylinder.

2. An improvement as claimed in claim 1, said hollow cylinder being filled with a fluid medium, said rotary member being supported in said fluid medium.

3. An improvement as claimed in claim 2, said fluid medium comprising oil.

4. An improvement as claimed in claim 2, at least one of the surfaces being contacted between the inner surface of said hollow cylinder and the outer surface of said rotary member being roughened so as to increase the extent of friction therebetween.

5. An improvement as claimed in claim 4, at least one of said contact surfaces having axially extending grooves, ridges or slits formed therein.

6. An improvement as claimed in claim 1, said rotary member being constituted of a soft-magnetic material.

7. An improvement as claimed in claim 6, said soft-magnetic material comprising iron.

8. An improvement as claimed in claim 7, said soft-magnetic material comprising iron.

9. In a step motor comprising a plurality of axially serially positioned stator systems and a rotor; and at least one rotary member being in frictionally rotatable communication with said rotor for effecting rotary oscillation damping thereof, the improvement comprising; said rotary element being an integrated element and being positioned in the main stream of said stator systems, said rotor being solidly constructed, at least one annular recess being formed in said rotor; and at least one ring extending coaxial with the rotor axis being rotatably supported in said annular recess so as to form friction damping means.

10. An improvement as claimed in claim 9, said rotor comprising a plurality of axially serially assembled elements, said elements having alternate cylindrical sections of smaller and of larger diameters, a plurality of said rings being rotatably supported one each on respectively each one of said smaller diameter rotor elements.

11. An improvement as claimed in claim 10, comprising insulating discs of non-magnetic material being positioned intermediate said rings and said rotor, and the side contact surfaces of said larger diameter rotor elements.

12. An improvement as claimed in claim 10, comprising axially extending screw bolt means adapted to interconnect said rotor elements.

13. An improvement as claimed in claim 12, said rotor comprising end closure means, each said end closure means being a cylindrical rotor element of larger diameter and having a shaft end of smaller diameter, and axially extending bores being formed in said end closure means for receiving said screw bolt means.

14. An improvement as claimed in claim 9, said ring being constituted of a soft-magnetic material.

* * * * *